(12) United States Patent
Kedalagudde et al.

(10) Patent No.: US 11,950,183 B2
(45) Date of Patent: *Apr. 2, 2024

(54) NETWORK SLICE SELECTION IN NETWORK SYSTEMS

(71) Applicant: Apple Inc., Cupertino, CA (US)

(72) Inventors: Meghashree Dattatri Kedalagudde, Portland, OR (US); Ana Lucia Pinheiro, Hillsboro, OR (US); Puneet Jain, Hillsboro, OR (US); Vivek Gupta, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/697,130

(22) Filed: Mar. 17, 2022

(65) Prior Publication Data

US 2022/0210728 A1 Jun. 30, 2022

Related U.S. Application Data

(63) Continuation of application No. 16/063,048, filed as application No. PCT/US2016/039054 on Jun. 23, 2016, now Pat. No. 11,304,129.

(Continued)

(51) Int. Cl.
*H04L 45/586* (2022.01)
*H04L 45/302* (2022.01)
(Continued)

(52) U.S. Cl.
CPC ........... *H04W 48/18* (2013.01); *H04L 45/306* (2013.01); *H04L 45/586* (2013.01); *H04L 47/78* (2013.01);
(Continued)

(58) Field of Classification Search
CPC ..... H04W 48/18; H04W 76/27; H04W 88/08; H04L 45/306; H04L 45/586; H04L 47/78; H04L 47/781; H04L 47/803
See application file for complete search history.

(56) References Cited

U.S. PATENT DOCUMENTS 10,341,947 B2    7/2019  Mathai
11,304,129 B2 *  4/2022  Kedalagudde ........ H04W 88/08
(Continued)

FOREIGN PATENT DOCUMENTS

CN    104579732 A    4/2015
TW    I476581 B      3/2015
(Continued)

OTHER PUBLICATIONS

Chinese Patent Search Report in connection with Chinese Patent Application No. 2016800742916.
(Continued)

*Primary Examiner* — Mansour Oveissi
(74) *Attorney, Agent, or Firm* — Eschweiler & Potashnik, LLC

(57) ABSTRACT

Various embodiments are generally directed to network slice selector (NSS). In one embodiment, for example, an evolved node B (eNB) may include a processor circuit, and an NSS for execution by the processor circuit to allocate a network slice (NS) to a user equipment (UE). The NS may comprise one or more virtual network function(s) (VNF). In one implementation, a VNF takes on the responsibility of handing specific network functions run on one or more virtual machines (VM) associated with hardware networking infrastructures, such as routers, switches, etc. Individual VNFs may be combined or connected together to provide a complete networking communication service for UEs. Other embodiments are described and claimed.

20 Claims, 11 Drawing Sheets

Related U.S. Application Data

(60) Provisional application No. 62/279,494, filed on Jan. 15, 2016.

(51) Int. Cl.

| | |
|---|---|
| *H04L 47/78* | (2022.01) |
| *H04L 47/80* | (2022.01) |
| *H04W 48/18* | (2009.01) |
| *H04W 76/27* | (2018.01) |
| *H04W 88/08* | (2009.01) |

(52) U.S. Cl.
CPC .......... *H04L 47/781* (2013.01); *H04L 47/803* (2013.01); *H04W 76/27* (2018.02); *H04W 88/08* (2013.01)

(56) References Cited

U.S. PATENT DOCUMENTS

| | | | |
|---|---|---|---|
| 2007/0130456 A1 | 6/2007 | Kuo | |
| 2015/0288622 A1 | 10/2015 | Fargano | |
| 2016/0088519 A1 | 3/2016 | Hoffmann | |
| 2016/0234082 A1 | 8/2016 | Xia | |
| 2017/0245316 A1* | 8/2017 | Salkintzis | H04W 48/18 |
| 2017/0302646 A1 | 10/2017 | Wang | |
| 2017/0311304 A1* | 10/2017 | Lu | H04N 21/4131 |
| 2017/0332226 A1* | 11/2017 | Bharatia | H04W 76/10 |
| 2018/0310238 A1* | 10/2018 | Opsenica | H04W 12/06 |
| 2019/0021047 A1* | 1/2019 | Zong | H04W 40/24 |

FOREIGN PATENT DOCUMENTS

| | | |
|---|---|---|
| WO | 2014173426 A1 | 10/2014 |
| WO | 2015149600 A1 | 10/2015 |
| WO | 2015178035 A1 | 11/2015 |

OTHER PUBLICATIONS

Ericsson; "VNF Model"; 3GPP TSG SA WG5 (Telecom Management) Meeting #103; Oct. 12-16, 2015, Vancouver (Canada); S5--155129; S5-154059.

3rd Generation Partnership Project; Technical Specification Group Services and System Aspects; Telecommunication management; Study on network management of virtualized networks (Release 13), 3GPP Standard; 3GPP TR 1 32.842, 3rd Generation Partnership Project (3GPP), Mobile Competence Centre; vol. SA WG5, No. V13.1.0, Dec. 18, 2015; pp. 1-84.

NGMN_5G_White_Paper_V1_0, ETSI Draft; NGMN_5G_White_Paper_V1_0, European Telecommunications Standards Institute (ETSI); Jun. 25, 2015; pp. 1-125.

International Search Report for International Patent Application PCT/US2016/039054, dated Sep. 19, 2016.

Notice of Allowance dated Dec. 8, 2021 in connection with U.S. Appl. No. 16/063,048.

Non-Final Office Action dated Jun. 30, 2021 in connection with U.S. Appl. No. 16/063,048.

Non-Final Office Action dated Jul. 16, 2020 in connection with U.S. Appl. No. 16/063,048.

Non-Final Office Action dated Jul. 22, 2019 in connection with U.S. Appl. No. 16/063,048.

Written Opinion for International Patent Application PCT/US2016/039054, dated Sep. 19, 2016.

* cited by examiner

*FIG. 11*

Storage Medium 1100

*Computer Executable Instructions 1102*

NETWORK SLICE SELECTION IN NETWORK SYSTEMS

RELATED CASE

This application is a Continuation of U.S. patent application Ser. No. 16/063,048 filed on Jun. 15, 2018, which is a National Phase entry application of International Patent Application No. PCT/US2019/047843 filed Aug. 23, 2019, which claims priority to U.S. Provisional Application 62/279,494 filed on Jan. 15, 2016, entitled "NETWORK SLICE SELECTION IN NETWORK SYSTEMS" both of which are hereby incorporated by reference in their entireties.

TECHNICAL FIELD

Embodiments herein generally relate to network slice selection in network systems. In particular, the present disclosure relates to network slice selection in 3rd Generation Partnership Project (3GPP) and 5G network systems.

BACKGROUND

Network systems are generally rigidly built systems that work well for subscriber networks with predictable traffic types (e.g., voice and/or data) and growth forecasts. However, the rigidly built network systems do not scale well to support changing subscriber demands. Furthermore, such network systems are unable to efficiently meet the emerging use cases, which include machine-to-machine (M2M) devices that may require highly reliable data only service, services that require high data speeds with low latency (e.g., video streaming services), and emergency services that require instant and highly reliable access to network capacity and coverage.

BRIEF DESCRIPTION OF THE DRAWINGS

FIG. 11 illustrates one embodiment of a storage medium

DETAILED DESCRIPTION

Figure 1:
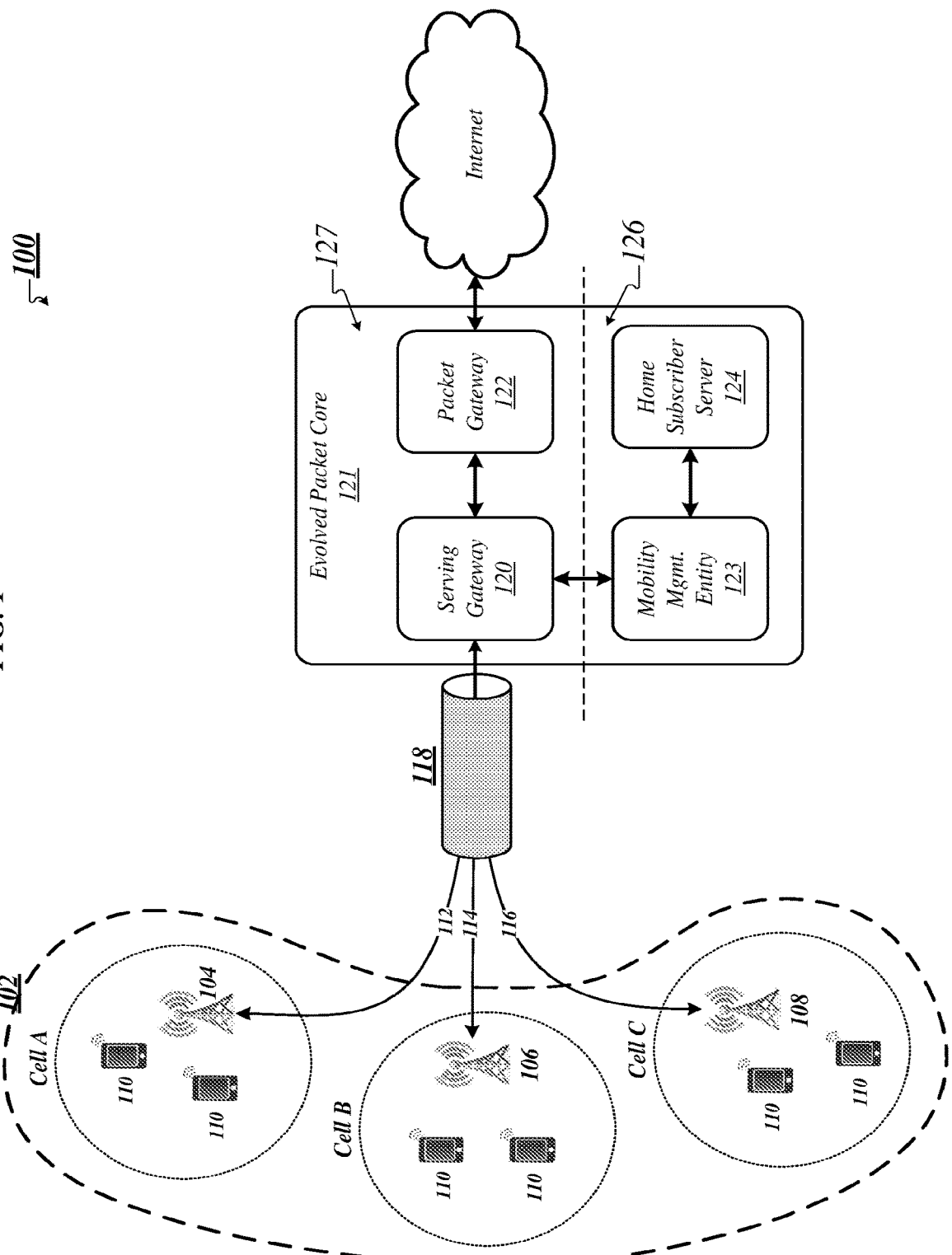
FIG. 1 illustrates one embodiment of an operating environment.

Various embodiments are generally directed to network slice selector (NSS). In one embodiment, for example, an evolved node B (eNB) may comprise a processor circuit, and an NSS component, referred to simply as NSS herein, for execution by the processor circuit to allocate a network slice (NS) to a user equipment (UE). The NS may comprise one or more virtual network function(s) (VNF). In one implementation, a VNF takes on the responsibility of handing specific network functions run on one or more virtual machines (VM) associated with hardware networking infrastructures, such as routers, switches, etc. Individual VNFs may be combined or connected together to provide a complete networking communication service for UEs.

In one implementation, the NSS may use a radio resource control (RRC) connection request message to ascertain the NS that will be allocated to the UE. The RRC connection request message may include a UEs identity (e.g., a random value) and a profile of the UE that transmitted the RRC connection request message. The NS, in one implementation, may use the profile of the UE to select the NS that will be allocated to the UE.

In one implementation, the NSS and one or more NS are implemented in an eNB. In another implementation, the NSS and one or more NS are implemented in the evolved packet core (EPC) or the mobility management entity (MME). In yet another implementation, the NSS is implemented in an NS, where the NS includes at least one default VNF. In one implementation, the NS including the NSS and the at least one default VNF is implemented in the MME. In yet another implementation, the NSS is implemented by an MME-stub, and one or more NS and associated VNFs are implemented by the MME. In another implementation, the NSS is implemented as an element outside of the EPC. In another implementation, the NSS is implemented in an NS, where the NS includes at least one default VNF, and the NS including the NSS is implemented in the control plane of the EPC. In one implementation, the NS is implemented in the user plane of the EPC.

Various embodiments may comprise one or more element. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connection using one or more wireless mobile broadband technology. For example, various embodiments may involve transmissions over one or more wireless connection according to one or more 3rd Generation Partnership Project (3GPP), 3GPP Long Term Evolution (LTE), and/or 3GPP LTE-Advanced (LTE ADV) technologies and/or standards, including their revisions, progeny and variants. Some embodiments may additionally or alternatively involve transmissions according to one or more Global System for Mobile Communications (GSM)/Enhanced Data Rates for GSM Evolution (EDGE), Universal Mobile Telecommunications System (UMTS)/ High Speed Packet Access (HSPA), and/or GSM with General Packet Radio Service (GPRS) system (GSM/GPRS) technologies and/or standards, including their revisions, progeny and variants.

Examples of wireless mobile broadband technologies may also include without limitation any of the Institute of Electrical and Electronics Engineers (IEEE) 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants. The embodiments are not limited in this context.

In addition to transmission over one or more wireless connection, the techniques disclosed herein may involve transmission of content over one or more wired connection through one or more wired communication medium. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments may be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an example of an operating environment 100 that may be representative of various embodiments. As shown in FIG. 1, a radio access network 102 comprises wireless communications cells A, B, and C. Wireless communications cells A, B, and C are served by respective base stations 104, 106, and 108. Each of base stations 104, 106, and 108 serves various mobile devices 110. In order to provide data service to the various mobile devices 110, also reference herein as UEs 110, radio access network 102 communicates with a serving gateway 120, which in turn communicates with a packet gateway 122. The embodiments are not limited in this context.

In some embodiments, serving gateway 120 may comprise a network entity operative to route and/or forward user data packets for one or more mobile device 110 in radio access network 102. In various embodiments, packet gateway 122 may comprise a network entity operative as a point of exit from and entry into an external packet data network for data exchanged between one or more mobile devices 110 in radio access network 102 and the external packet data network. In some embodiments, for example, packet gateway may provide data connectivity to the Internet for one or more mobile device 110 in radio access network 102. In various embodiments, serving gateway 120 and/or packet gateway 122 may comprise network devices and/or nodes of a core network. For example, in some embodiments, serving gateway 120 may comprise a serving gateway (S-GW) of the EPC 121 structured according to a system architecture evolution (SAE) architecture, and packet gateway 122 may comprise a packet data network (PDN) gateway (P-GW) of the EPC 121. Furthermore, the EPC 121 may comprise a MME 123 and a home subscriber server (HSS) 124. The embodiments are not limited to this example.

In general, the HSS 124 is a database that contains user-related and subscriber-related information. It also provides support functions in mobility management, call and session setup, user authentication and access authorization. The MME 123 deals with the control plane 126. It handles the signaling related to mobility and security evolved UMTS terrestrial radio access network (E-UTRAN) access. Furthermore, the MME 123 is responsible for the tracking and the paging of UEs 110 in idle-mode. The MME 123 the termination point of the Non-Access Stratum (NAS). The serving gateway 120 and the packet gateway 122 are part of the user plane 127. The MME 123 and the HSS 124 are part of the control plane 126. The embodiments are not limited in this context.

In various embodiments, base stations 104, 106, and 108 may be operative to communicate with serving gateway 120 via respective communication connections 112, 114, and 116. The communication connections 112, 114, and 116 may be collectively referred to herein as an interface 118. The interface 118 may comprise any combination of network communications interfaces, connections, and/or devices operative to enable radio access network 102 to exchange user plane 127 communications with serving gateway 120. In some embodiments, for example, the interface 118 may comprise an interface that enables a 3GPP radio access network (RAN) to exchange user plane 127 communications with an S-GW of the EPC 121. In some embodiments, base stations 104, 106, and 108 may be operative to exchange control plane 126 communications with MME 123 via one or more control interface (not depicted in FIG. 1). An example of such a one or more interface is a S1-MME interface between a base station (104, 106, and/or 108) and the MME 123. In various embodiments, interface 118 may include one or more intermediate network device and/or node. In some embodiments, some or all of the one or more intermediate network device and/or node may comprise intermediate packet routing devices and/or nodes. In various embodiments, one or more intermediate packet routing device and/or node may enable radio access network 102 to exchange user plane 127 communications with the serving gateway 120 when radio access network 102 operates according to a different protocol than the serving gateway 120. For example, in some embodiments, interface 118 may include a serving GPRS support node (SGSN) that enables the exchange of the user plane 127 communications between a UTRAN and an S-GW. In general, the interface 118 may comprise switches, routers and other connecting devices. For example, the interface 118 may comprise fiber cables, copper cables or other wire or wireless connecting devices connecting switches, routers and other connecting devices and wire and/or wireless communication devices. The embodiments are not limited in this context.

In various embodiments, radio access network 102 may comprise a 4G radio access network. In an example embodiment, radio access network 102 may comprise an E-UTRAN, base stations 104, 106, and 108 may comprise evolved node Bs (eNBs), serving gateway 120 may comprise an S-GW of the EPC 121, and connections 112, 114, and 116 may comprise interface connections between the eNBs and the S-GW. The embodiments are not limited to this example.

In some other embodiments, radio access network 102 may comprise a 5G, 4G, 3G and/or 2G radio access network of another type. In various such embodiments, interface 118 may include one or more intermediate network device and/or nodes. In some embodiments, the one or more intermediate network devices and/or nodes may include one or more intermediate packet routing device and/or node operative to enable the 5G, 4G, 3G and/or 2G radio access network to exchange user plane 127 communications with the serving gateway.

In an example embodiment, radio access network 102 may comprise a UTRAN, base stations 104, 106, and 108 may comprise node eNBs, serving gateway 120 may comprise an S-GW of an EPC 121, and interface 118 may include a radio network controller (RNC) and an SGSN. In this example embodiment, connections 112, 114, and 116 may comprise connections between the node eNBs and the RNC, and the RNC may communicate with the SGSN over an interface connection. The embodiments are not limited in this context.

In another example embodiment, radio access network 102 may comprise a GSM/EDGE radio access network (GERAN), base stations 104, 106, and 108 may comprise base transceiver stations (BTSs), and the interface 118 may include a base station controller (BSC) and an SGSN. In this example embodiment, connections 112, 114, and 116 may comprise connections between the BTSs and the BSC, and the BSC may communicate with the SGSN over an interface connection. The embodiments are not limited to these examples.

In various embodiments, interface 118 may have an associated uplink capacity and an associated downlink capacity, which may comprise overall rates at which interface 118 can convey user plane 127 communications between radio access network 102 and serving gateway 120 in the uplink and downlink directions, respectively. The embodiments are not limited in this context.

In various embodiments, the NS selection process may be initiated by the MME 123, elements of the MME 123, or a combination of elements associated with the MME 123. In some embodiments, more than one of the aforementioned devices may be capable of initiating the NS selection process. For example, in various embodiments, each of base stations 104, 106, and 108 may comprise an eNB capable of the NS selection process by way of an NSS. The embodiments are not limited to this example.

Figure 2:
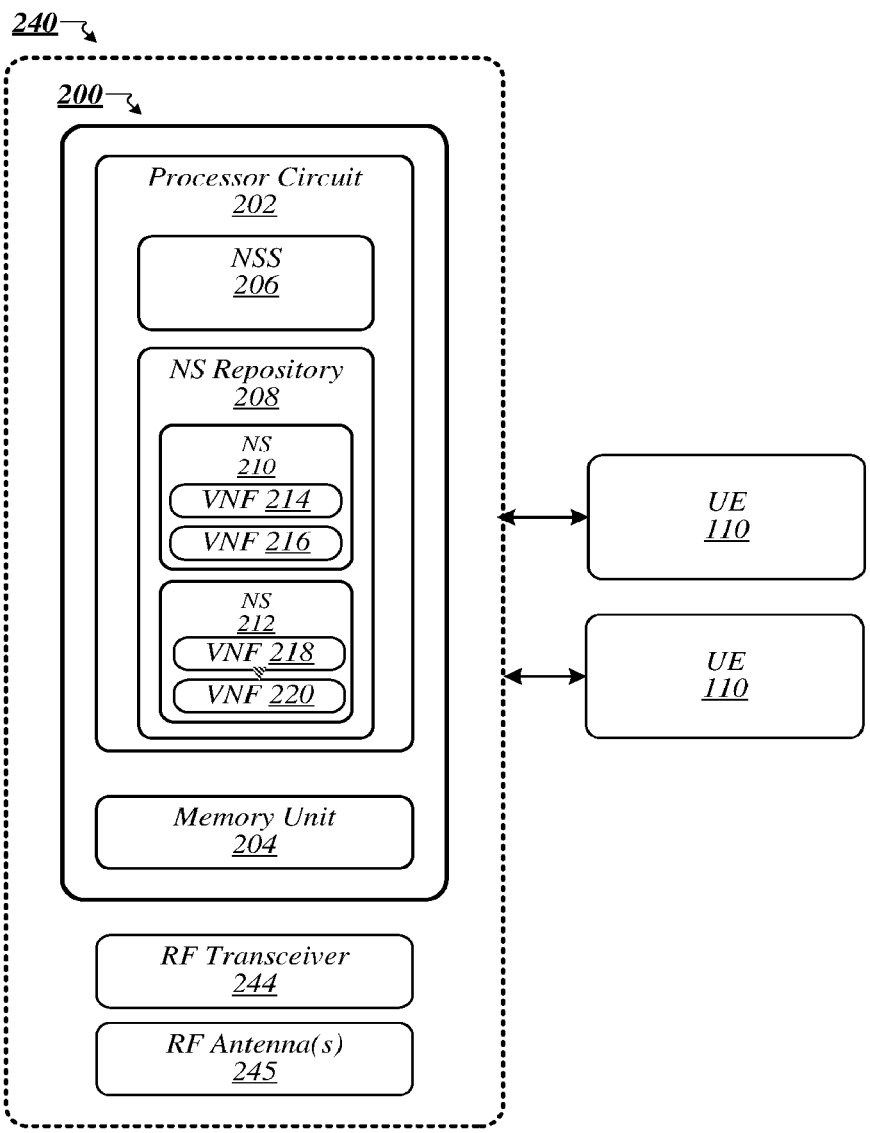
FIG. 2 illustrates one embodiment of an apparatus and one embodiment of a system.

FIG. 2 illustrates a block diagram of an apparatus 200 comprising an example of a network device or node that may be capable of providing one or more NS in an operating environment, such as example operating environment 100 of FIG. 1. Examples of apparatus 200 may include an eNB, a device or devices in the EPC 121 (e.g., MME 123), or a standalone device or devices that provide NSs. The embodiments are not limited to these examples. Furthermore, the embodiments are not limited to the type, number, or arrangement of elements shown in FIG. 2. In addition, some or all of the associated with the apparatus 200 may be implemented by various other devices and systems described herein.

In some embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In various embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in some embodiments. The embodiments are not limited in this context.

FIG. 2 also illustrates a block diagram of a system 240. System 240 may comprise any of the aforementioned elements of apparatus 200. System 240 may further comprise a radio frequency (RF) transceiver 244 and one or more RF antenna 245. RF transceiver 244 may include one or more radio capable of transmitting and receiving signals using various suitable wireless communications techniques. Such techniques may involve communications across one or more wireless network, such as any of the aforementioned example wireless networks, according to one or more wireless communications technology and/or standard, such as any of the aforementioned example wireless communications technologies and/or standards. Examples of RF antennas 245 may include internal antennas, omni-directional antennas, monopole antennas, dipole antennas, end-fed antennas, circularly polarized antennas, micro-strip antennas, diversity antennas, dual antennas, tri-band antennas, quad-band antennas, and so forth. The embodiments are not limited to these examples.

In general operation, apparatus 200 and/or system 240 allocate an NS (e.g., NS 210 or 212) to one or more UE 110. In various embodiments, apparatus 200 and/or system 240 may comprise an NSS component 206. In one implementation, the NSS 206 is a VNF. Therefore, the NSS 206 embodied as a VNF may provide additional virtual functionality in addition to the functionality of the NSS 206. This concept is described hereinafter in this disclosure. In various embodiments, apparatus 200 and/or system 240 may comprise an NS repository 208 (e.g., storage medium) that includes one or more NS 210 and NS 212. Each NS 210 and 212 may include one or more VNF 214-220. In one implementation, the VNFs 214 and 216 in NS 210 are selected and included therein to meet the specific network needs of a first UE 110 type, where the VNFs 218 and 220 in the NS 212 are selected and included therein to meet the specific network needs of a second UE 110 type. For example, the first UE 110 may have a first set of data rate, mobility, latency tolerance, duty cycle, range and/or battery life requirements. The VNFs 214 and 216 of the NS 210 are bundled together to at least meet some or all of the indicated requirements of the first UE 110. Similarly, the second UE 110 may have a second set of data rate, mobility, latency tolerance, duty cycle, range and/or battery life requirements. The VNFs 218 and 220 of the NS 212 are bundled together to at least meet some or all of the indicated requirements of the second UE 110. The identified first set of UE requirements and second set of UE requirements may be unique. In one implementation, the NSS 206 selects the NS 210 or 212, for example, which will efficiently provision a given UE 110 in accordance some or more of the afore indicated requirements (e.g., UE data rate, mobility, latency tolerance, duty cycle, range and/or battery life requirements). The embodiments are not limited in this context.

In various embodiments, the UE 110 sends an RRC connection request message to the system 240. In one implementation, the RRC connection request message is sent to the system 240 using a common control channel (CCCH). The RRC connection request message may include a UE identity value (e.g., a random value) and a profile of the UE 110 that transmitted the RRC connection request message. The NSS 206 may use the UE identity value and/or profile of the UE 110 to select an NS (e.g., NS 210 or 212), and associated one or more VNF, that may be used to provision the UE 110. The embodiments are not limited in this context. In particular, the UE 110 may communicate its profile to the system 240, wirelessly or over wireline, using a message or communication other than an RRC connection request message. In another example, the system 240 may store, such as in memory unit 204, one or more profile for a plurality of UE 110 types. The system 240 may use such stored one or more profile to enable the NSS 206 select an appropriate NS (e.g., 210 or 212) to provision UEs 110. For example, the UE identity value associated with the UE 110 may be sufficient for the system 240 and the NSS 206 to select an appropriate NS (e.g., 210 or 212) to provision the UE 110. More specifically, the system 240 may use the UE identity value associated with the UE 110 to determine a network subscription that is allocated to the UE 110. The system 240 may then use the NSS 206 to select the NS (e.g., NS 210 or 212) that is allocated to the UE 110. The embodiments are not limited in this context.

The UEs 110 may be embodied as any type of connected device, permanent or intermittent. For example, VNF provisioning described herein may be useful for wireless mobile phones, wearables (e.g., video streaming, sports wearables, and file sharing devices), health monitoring devices, security and surveillance devices, point of sales devices, automation and monitoring devices, automotive telematics devices, fleet management and logistics devices, utility devices, and so forth. Each of the indicated type of UE 110 may require a specific type of network provisioning. More specifically, one UE type may require low latency, high bandwidth, and coverage for limited geographical area. On the other hand, another UE type may require data only coverage with high availability and robustness, and medium security and latency. Furthermore, yet another UE type may require a very high data throughput with very low latency. The NSS 206 is functional to select an NS, and is associated one or more VNF, for provisioning a UE with connectivity services appropriate for the UE's needs (e.g., geographical coverage area, duration of connectivity, capacity, speed, latency, robustness, security and availability). The embodiments are not limited in this context.

Figure 3:
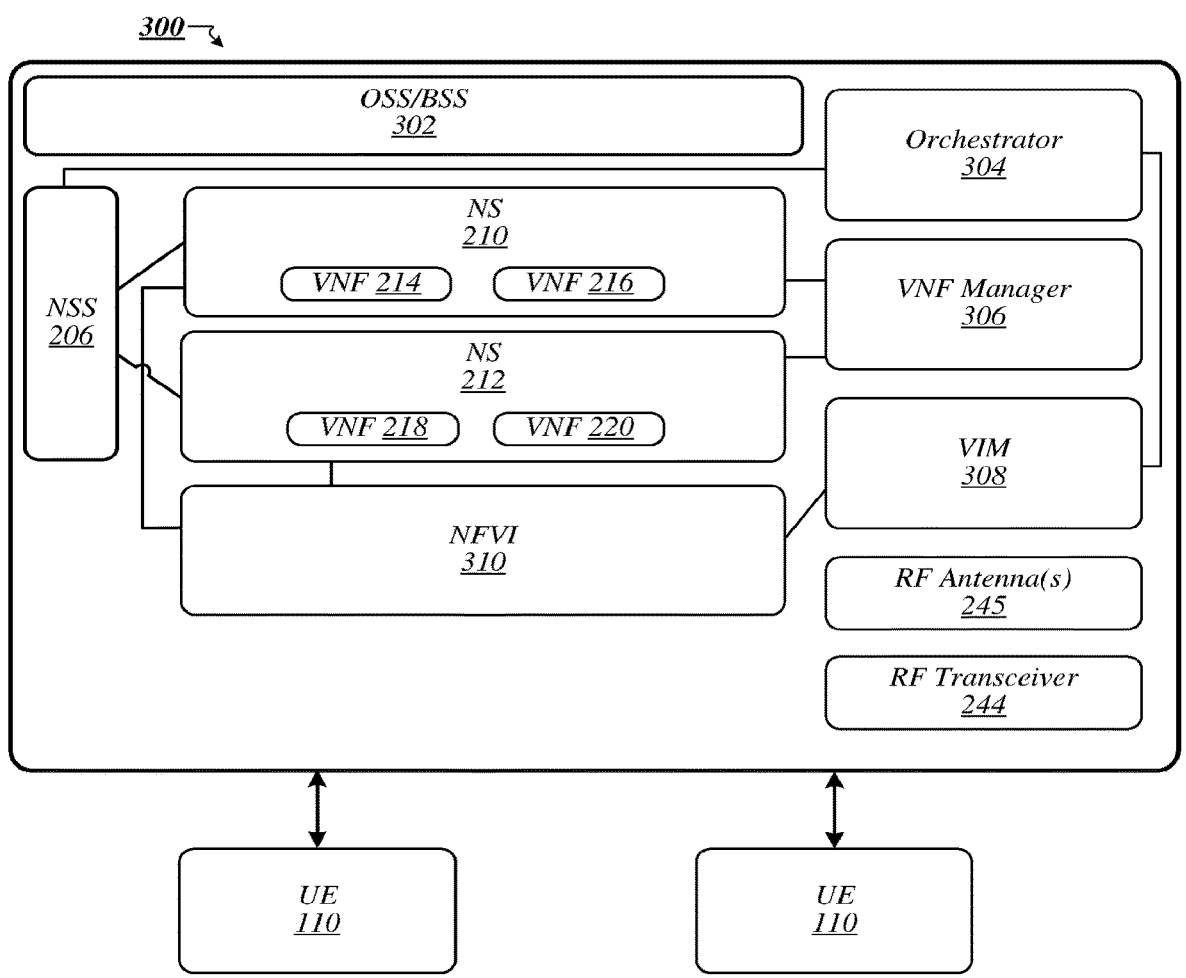
FIG. 3 illustrates one embodiment of a block diagram of a system.

FIG. 3 also illustrates a block diagram of a system 300. In one implementation, the system 300 is associated with a base station, such as one of the base stations 104-108. In one embodiment, the system 300 is associated with an eNB. In another implementation, some or all of the elements of the system 300 are associated with the EPC 121, MME 123, or control plane 126. In another implementation, the system 300 is an independent communication network entity. The system 300 is illustrated as comprising various elements. The system 300 are not limited in this context. For example, the system 300 may at least comprise one or more element shown in FIG. 2.

In one implementation, the system 300 may comprise a business support system/operations support system component (BSS/OSS) 302. BSS may refer to components that a service provider (such as a telephone operator or telecommunications company) might use to run its business operations, including, for example, taking orders, handling payment issues, or dealing with revenue, and the like. BSS might generally cover the four main areas of product management, customer management, revenue management, and order management. In a related manner, OSS might refer to components used by telecommunications service providers to deal with the telecommunications network itself, supporting processes including, but not limited to, maintaining network inventory, provisioning services, configuring network components, managing faults, and the like. The two systems functioning together may be referred to as the BSS/OSS 302.

The radio frequency (RF) transceiver 244 and the one or more RF antenna 245 may be used by the system 300. RF transceiver 244 may include one or more radio capable of transmitting and receiving signals using various suitable wireless communications techniques. Such techniques may involve communications across one or more wireless network, such as any of the aforementioned example wireless networks, according to one or more wireless communication technology and/or standard, such as any of the aforementioned example wireless communications technologies and/or standards. Examples of RF antennas 245 may include internal antennas, omni-directional antennas, monopole antennas, dipole antennas, end-fed antennas, circularly polarized antennas, micro-strip antennas, diversity antennas, dual antennas, tri-band antennas, quad-band antennas, and so forth. The embodiments are not limited to these examples.

The system 300 may further comprise a virtual network functions orchestrator 304. The orchestrator 304 may be coupled to the BSS/OSS 302. The orchestrator 304 may be coupled to one or more VNF manager (VNFM) 306. The VNFM 306 may be coupled to one or more virtualized infrastructure manager (VIM) 308. The VIM 308 may be coupled to NFV Infrastructure component (NFVI) 310.

The orchestrator 304 may manage the network service lifecycle and coordinates the management of the network service lifecycle, VNF lifecycle (supported by the VNFM 306), and NFVI 310 resources (supported by the VIM 308) to ensure allocation of the necessary resources and connectivity. The VNFM 306 may communicate with the NSs 210 and 212 and associated VNFs 214-220, and may be responsible for VNF lifecycle management (e.g. instantiation, update, query, scaling, and termination). For example, in one embodiment, a VNFM 306 may be deployed for each NS 210 and 212 and associated VNFs 214-220. In some cases, a single VNFM 306 may serve each NS 210 and 212 and associated VNFs 214-220. The VIM 308 may be responsible for controlling and managing the compute, storage and network resources of the NFVI 310. In other words, the VIM 308 may be configured to control and manage the interaction of each NS 210 and 212 and associated VNFs 214-220 with the computing, storage and network resources in NFVI 310. In one example, the VIM 308 may perform resource management functions, such as management of infrastructure resource and allocation (e.g. increase resources to VMs, improve energy efficiency, and resource reclamation). The VIM 306 and the VNFM 308 may communicate with each other for resource allocation requests and to exchange virtualized hardware resource configuration and state information. The embodiments are not limited in this context.

While two NSs 210 and 212 are illustrated, it is expressly contemplated that any number of these elements may be found in a system, and the selection of two is purely for the purpose of convenience. Similarly, while each NS 210 and 212 is shown having two VNFs (e.g., VNFs 214-220) it is expressly contemplated that any number of these elements may be found in a system, and the selection of two is purely for the purpose of convenience. Moreover, it is understood that alternate configurations are contemplated by this disclosure. The embodiments are not limited in this context.

Each VNF 214-220 may be a virtualization of a network function in a non-virtualized network. For example, the network functions in the non-virtualized network may be 3GPP EPC network elements, e.g. MME, SGW, PGW; elements in a home network, e.g. residential gateway (RGW); and conventional network functions, e.g. dynamic host configuration protocol (DHCP) servers, firewalls, etc. Each VNF 214-220 may be composed of one or more internal component, called virtualized network function component (VNFC). Each VNFC may provide a defined subset of a given VNF's functionality, with the main characteristic that a single instance of this component maps 1:1 against a single virtualization container. For example, one VNF can be deployed over multiple VMs, where each VM hosts a VNFC of the VNF. However, in other cases, the whole VNF can be deployed in a single VM as well. A VM may be virtualized computation environment that behaves like a physical device, such as a computer or server, which has all its ingredients (processor, memory/storage, interfaces/ports) of a physical computer/server and is generated by a hypervisor, which partitions the underlying physical resources and allocates them to VMs. A hypervisor may be piece of software which partitions the underlying physical resources and creates virtual machines, and isolates the virtual machines from each other.

The NFVI 310 represents various hardware and software components which build up the environment in which the VNFs 214-220 are deployed, managed and executed. For example, the hardware components in the NFVI 310 may include computing hardware, storage hardware, and network hardware that provide processing, storage and connectivity to VNFs 214-220 through a virtualization layer. The computing hardware may be any device configured to, designed to, or otherwise enabled to provide processing and computing resources. The storage hardware may be any kind of device which is used to store information for later retrieval. Examples of storage devices include flash memory, magnetic rotation disks, optical disks, or any other mechanism capable of storing information for later retrieval, such as the memory unit 204. Storage hardware may be differentiated between shared network attached storage and local storage that is connected directly to the NFVI 310 using an internal bus or other attachment mechanism. In one embodiment, the resources from the computing hardware and storage hardware may be pooled together. The network hardware may be switches that is configured to perform switching functions, e.g. routers, and wired or wireless links. The network hardware may span across a plurality of network domains. The embodiments are not limited in this context.

The virtualization layer within the NFVI 310 may abstract the hardware resources, i.e., computing hardware, storage hardware, and network hardware and decouple one or more of the VNF 214-220 from the underlying hardware. For example, the virtualization layer may be responsible for abstracting and logically partitioning hardware resources, enabling the software that implements one or more of the VNF 214-220 to use the underlying virtualized infrastructure, and providing virtualized resources to one or more of the VNF 214-220. The virtualized resources controlled by the virtualization layer may include a virtual computing, a virtual storage, and a virtual network. The embodiments are not limited in this context.

The system 300 may be operative to use at least one of the NSs 210 and/or 212 to provision at least one or more UE 110. Therefore, the system 300 may comprise the NSS 206. In various embodiments, the system 300 may comprise the NS repository 208 (e.g., storage medium) that includes the one or more NS 210 and NS 212. The NSs comprised in the NS repository 208 may be cataloged to enable ease of search and retrieval of the NSs. Search of the NSs cataloged in the repository 208 may be performed by the system 300, or the like. Each NS 210 and 212 may include one or more VNF 214-220. In one implementation, the VNFs 214 and 216 in NS 210 are selected and included therein to meet the specific network needs of a first UE 110 type, where the VNFs 218 and 220 in the NS 212 are selected and included therein to meet the specific network needs of a second UE 110 type. For example, the first UE 110 may have a first set of data rate, mobility, latency tolerance, duty cycle, range and/or battery life requirements. The VNFs 214 and 216 of the NS 210 are bundled together to at least meet some or all of the indicated requirements of the first UE 110. Similarly, the second UE 110 may have a second set of data rate, mobility, latency tolerance, duty cycle, range and/or battery life requirements. The VNFs 218 and 220 of the NS 212 are bundled together to at least meet some or all of the indicated requirements of the second UE 110. The identified first set of UE requirements and second set of UE requirements may be unique. In one implementation, the NSS 206 selects the NS 210 or 212, for example, which will efficiently provision a given UE 110 in accordance some or more of the afore indicated requirements (e.g., UE data rate, mobility, latency tolerance, duty cycle, range and/or battery life requirements). The embodiments are not limited in this context.

In various embodiments, the UE 110 sends an RRC connection request message to the system 300. In one implementation, the RRC connection request message is sent to the system 300 using a common control channel (CCCH). The RRC connection request message may include a UE identity value (e.g., a random value) and a profile of the UE 110 that transmitted the RRC connection request message. The NSS 206 may use the UE identity value and/or profile of the UE 110 to select an NS (e.g., NS 210 or 212), and associated one or more VNF, that may be used to provision the UE 110. The embodiments are not limited in this context. In particular, the UE 110 may communicate its profile to the system 300, wirelessly or over wireline, using a message other than an RRC connection request message. In another example, the system 300 may store, such as a storage medium (e.g., memory unit 204), one or more profile for a plurality of UE 110 types. The system 240 may use those stored one or more profile to enable the NSS 206 select an appropriate NS (e.g., NS 210 or 212) to provision UEs 110. For example, the UE identity value associated with the UE 110 may be sufficient for the system 240 and the NSS 206 to select an appropriate NS (e.g., 210 or 212) to provision the UE 110. More specifically, the system 300 may use the UE identity value associated with the UE 110 to determine a network subscription that is allocated to the UE 110. The system 300 may then use the NSS 206 to select the NS (e.g., NS 210 or 212) that is allocated to the UE 110. The embodiments are not limited in this context.

The UEs 110 may be embodied as any type of connected device, permanent or intermittent. For example, VNF provisioning described herein may be useful for wireless mobile phones, wearables (e.g., video streaming, sports wearables, and file sharing devices), health monitoring devices, security and surveillance devices, point of sales devices, automation and monitoring devices, automotive telematics devices, fleet management and logistics devices, utility devices, and so forth. Each of the indicated type of UE 110 may require a specific type of network provisioning. More specifically, one UE type may require low latency, high bandwidth, and coverage for limited geographical area. On the other hand, another UE type may require data only coverage with high availability and robustness, and medium security and latency. Furthermore, yet another UE type may require a very high data throughput with very low latency. The NSS 206 of the system 300 is functional to select an NS, and is associated one or more VNF, for provisioning a UE with connectivity services appropriate for the UE's needs (e.g., geographical coverage area, duration of connectivity, capacity, speed, latency, robustness, security and availability). The embodiments are not limited in this context.

This disclosure, as summarized in the foregoing, describes clustering VNFs in individual NSs to support provisioning devices based on their network connectivity needs. In other words, a first NS and associated VNFs may be implemented to support devices that primarily execute delay sensitive video applications, a second NS and associated VNFs may be implemented support devices that primarily require ultra-low latency network connectivity, a third NS and associated VNFs may be implemented to support devices that require ultra-reliable network connectivity, etc. In one example, each NS (e.g., NS 210 and 212) may include four VNFs (e.g., VNFs 214-220). A first of the four VNFs may provide network application and services based on device type (e.g., primarily video device, primarily audio device, M2M device, gaming device, particular Internet of things (IoT) device, sensor device, and/or vehicular device). A second of the four VNFs may provide network connectivity based on device type (e.g., bandwidth, low latency, reliability, speed, mobility, and/or cost per bit). A third of the four VNFs may provide a network functionality based on device type (e.g., authentication, integrity, paging, location, data services, handovers, packet routing, and/or charging). A fourth of the four VNFs may provide system resources based on device type (computing, processing, storage and/or networking). In general a VNF may be implemented to provide any service or action that can be applied to network packets, such as, by way of non-limiting example, domain name system (DNS) translation, directory services, e-mail, printing, file services, time services, voice over internet protocol (VoIP), authentication, routing, firewalls, zone firewalls, application firewalls, deep packet inspection, antivirus, spam filtering, antimalware, quality of service, netflow, wide-area application services, network address translation, IP security, NAT, IPSec, processing functionality, storage (RAM, ROM, storage medium, and application visibility and control.

Figure 4:
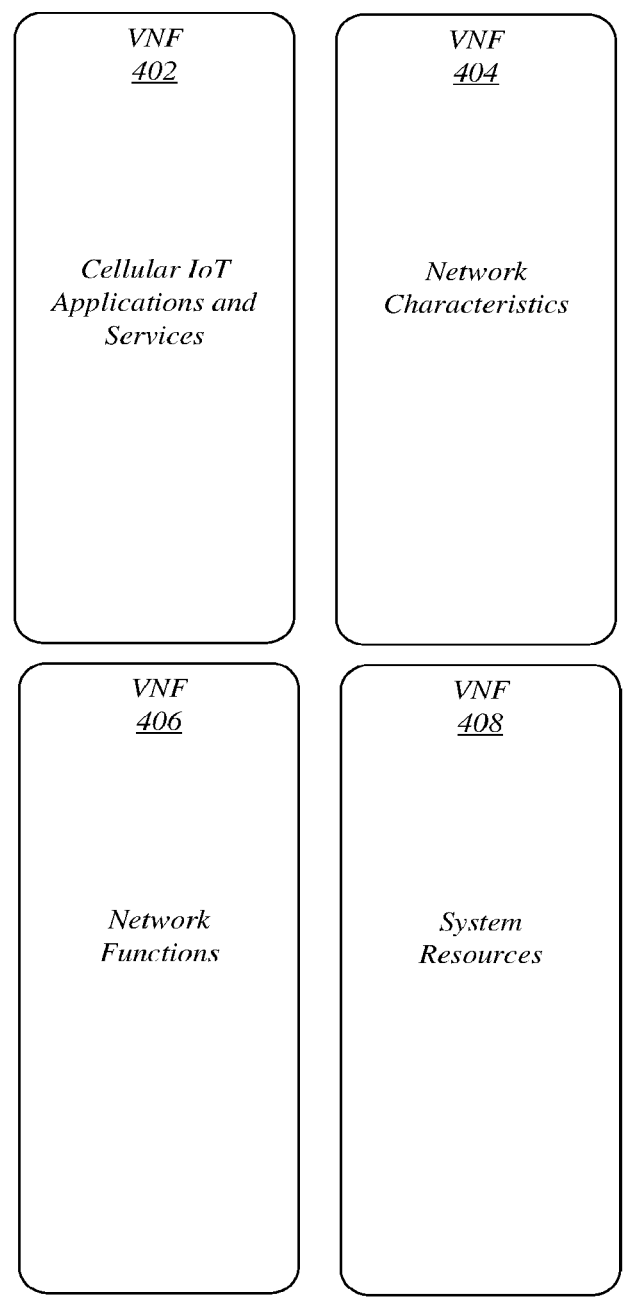
FIG. 4 illustrates one embodiment of a plurality of virtual network functions (VNF).

FIG. 4 illustrates a plurality of VNFs 402-408. In one implementation, one or more of the VNFs 214-220 may be enabled to provide the same functionality as one or more of the plurality of VNFs 402-408. The plurality of VNFs 402-408 may be associated with at least one NS (e.g, NS 210 and/or 212). In one example, the VNFs 402-408 may be used to provision at least one of the UEs 110. For example, one of the UEs 110 may be categorized as a cellular Internet of things (IoT) device. In one example, a cellular IoT device may require ubiquitous and enhanced coverage, reliable connectivity, moderate to high data rates, and precise positioning. A cellular IoT device may comprise an automation and monitoring device, wearable device, health monitoring device, vehicular device, fleet management device, security and surveillance device, automation and monitoring device, or structural (e.g., building) device. Each type of cellular IoT may have a unique provisioning requirements set (e.g., data rate, latency, battery, and speed). The embodiments are not limited in this context.

The VNF 402 may be enabled to allocate cellular IoT application and services provisioning. More specifically, the VNF 402 is implemented to allocate services for a particular type of cellular IoT device. For instance, in one example, the VNF 402 may allocate applications and services related to robust video and audio. In another example, the VNF 402 may include connectivity to cloud based computing and platforms with varying capabilities and strengths. Such platforms include Intel® Cloud Technology, GENI, Google Cloud, ThingWorx, OpenIoT, etc. The VNF 404 may be enabled to allocate network characteristics provisioning for a particular type of cellular IoT device. For example, the VNF 404 may be implemented to allocate virtualized latency, reliability and cost per bit for a particular type of cellular IoT device. For example, the VNF 404 may be enabled to allocate communication technology that uses frequencies and bandwidths to achieve a needed latency level. Furthermore, the VNF 404 may be enabled to allocate a network connectivity reliability level that achieves a required success rate for IoT service delivery. In addition, the VNF 404 may allocate a required cost per bit for the particular type of cellular IoT device. In one example, a low cost per hit may be achieved by enabling the VNF 404 to provision the particular type of cellular IoT device with LTE network technology or similar network technology. In one example, the VNF 406 is able to allocate network functions for a particular type of cellular IoT device. The network functions may include authentication integrity, paging, data services, and charging. The VNF 408 is functional to allocate system resources for a particular type of cellular IoT device. Such system resources include, for example, virtualized computing, processing, storage and/or network functionalities. The embodiments are not limited in this context.

Figure 5:
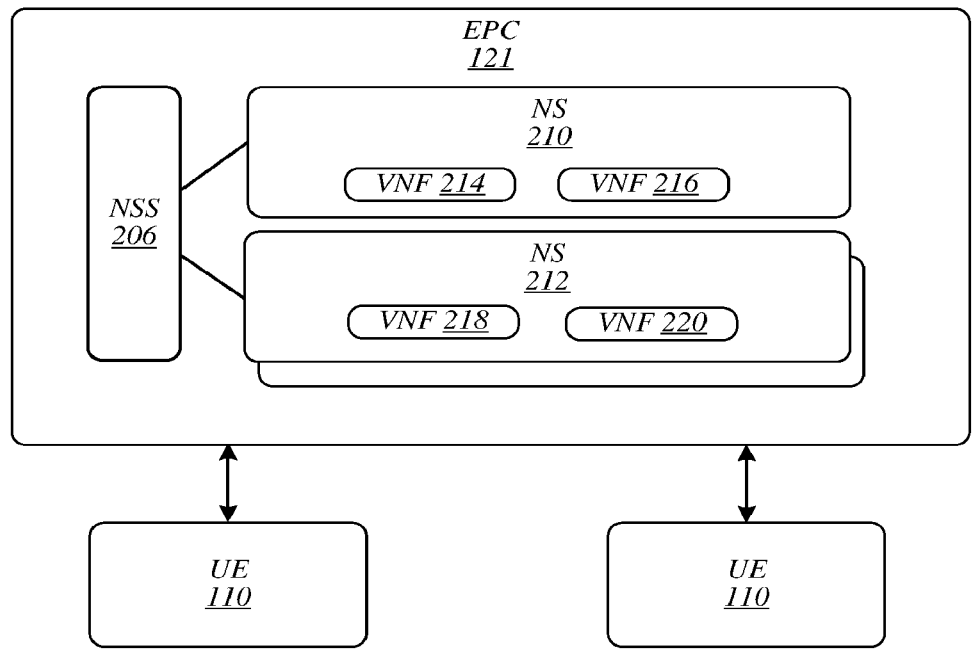
FIG. 5 illustrates one embodiment of the network slice selector (NSS) component and network slices (NS) as part of the evolved packet core (EPC).

FIG. 5 illustrates the NSS 206 and the NSs 210 and 212 as part of the EPC 121. The number of NSs is exemplary only. The EPC 121 may be operative to use at least one of the NSs 210 and/or 212 to provision at least one or more UE 110. Therefore, the EPC 121 may comprise the NSS 206. In various embodiments, the EPC 121 may comprise the NS repository 208 (e.g., storage medium) that includes the one or more NS 210 and NS 212. Each NS 210 and 212 may include one or more VNF 214-220. The NSs comprised in the NS repository 208 may be cataloged to enable ease of search and retrieval of the NSs. Search of the NSs cataloged in the repository 208 may be performed by the EPC 121, or the like. In one implementation, the VNFs 214 and 216 in NS 210 are selected and included therein to meet the specific network needs of a first UE 110 type, where the VNFs 218 and 220 in the NS 212 are selected and included therein to meet the specific network needs of a second UE 110 type. For example, the first UE 110 may have a first set of data rate, mobility, latency tolerance, duty cycle, range and/or battery life requirements. The VNFs 214 and 216 of the NS 210 are bundled together to at least meet some or all of the indicated requirements of the first UE 110. Similarly, the second UE 110 may have a second set of data rate, mobility, latency tolerance, duty cycle, range and/or battery life requirements. The VNFs 218 and 220 of the NS 212 are bundled together to at least meet some or all of the indicated requirements of the second UE 110. The identified first set of UE requirements and second set of UE requirements may be unique. In one implementation, the NSS 206 selects the NS 210 or 212, for example, which will efficiently provision a given UE 110 in accordance some or more of the afore indicated requirements (e.g., UE data rate, mobility, latency tolerance, duty cycle, range and/or battery life requirements). The embodiments are not limited in this context.

Figure 6:
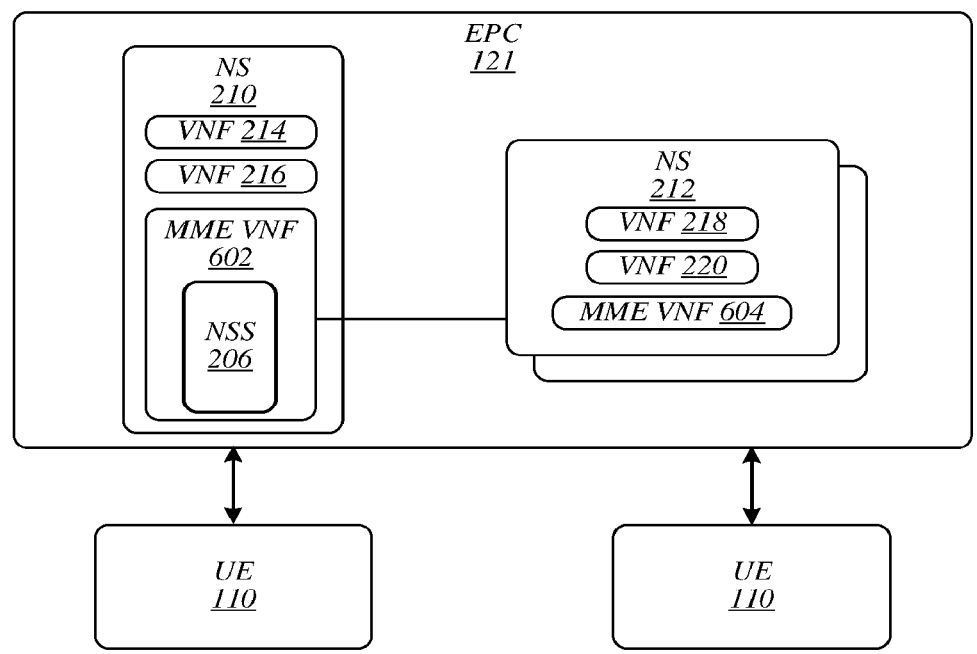
FIG. 6 illustrates another embodiment of the NSS and NSs as part of EPC.

FIG. 6 illustrates the NSS 206 and the NSs 210 and 212 as part of the EPC 121. In this example, the NS 210, in addition to the VNFs 214 and 216, includes an MME VNF 602 that implements the NSS 206. The number of NSs is exemplary only. The EPC 121 may be operative to use at least one of the NSs 210 and/or 212 to provision at least one or more UE 110. In this example embodiment, the NSS 206 is part of the NS 210, and the NSS 206 is associated with the MME VNF 602. Therefore, in this example embodiment, the NS 210 includes VNFs 214, 216 and MME VNF 602 that provision UEs 110 (e.g., all UEs 110) that request service from the EPC 121. In one implementation, the NS 210 may be considered a default NS. In one implementation, the MME VNF 602 includes a subset of MME functionality, virtualized, that will be allocated to UEs 110 (e.g., all UEs 110) that request service from the EPC 121. The subset of MME functionality may include, for example, a virtualized network access control that manages authentication and authorization for the UEs 110, and/or UE reachability for the UEs 110. In one implementation, the NSS 206 may be associated with one NS (e.g., NS 210, as is illustrated in FIG. 6). Alternatively, a plurality of NSs implemented may include an NSS, where each of the NSSs function together and/or separately to select one or more NS for provisioning UEs. The embodiments are not limited in this context.

In various embodiments, the EPC 121 may comprise the NS repository 208 (e.g., storage medium) that includes one or more NS 212. The NSs comprised in the NS repository 208 may be cataloged to enable ease of search and retrieval of the NSs. Search of the NSs cataloged in the repository 208 may be performed by the EPC 121, or the like. The NS 212 may include one or more VNF 218-220. Furthermore, the NS 212 may include an MME VNF 604. Furthermore, additional NSs implemented by the EPC 121 may include MME VNF types as well.

In one implementation, the VNFs 218 and 220 in the NS 212 are selected and included therein to meet the specific network needs of a first UE 110 type. For example, the first UE 110 may have a first set of data rate, mobility, latency tolerance, duty cycle, range and/or battery life requirements. The VNFs 218 and 220 of the NS 212 are bundled together to at least meet some or all of the indicated requirements of the first UE 110. Furthermore, the MME VNF 604 is included in the NS 212 to provide virtualized MME functionality that is tailored for the first UE 110. For example, the MME VNF 604 may provide a subset of MME functionality to the first UE 110. The subset of MME functionality may include, for example, virtualized mobility management, tracking area management, paging, lawful intercept and/or load-balancing. The embodiments are not limited in this context.

At least one additional NS and associated VNFs may be implemented in the EPC 121 to at least provide provisioning for some or all of the connectivity and network requirements of a second UE 110. In one implementation, the NSS 206 selects the NS, for example, which will efficiently provision a given UE 110 in accordance some or more of the afore indicated requirements (e.g., UE data rate, mobility, latency tolerance, duty cycle, range and/or battery life requirements). The embodiments are not limited in this context. The at least one additional NS may also include an MME VNF that is tailored for the second UE 110.

Figure 7:
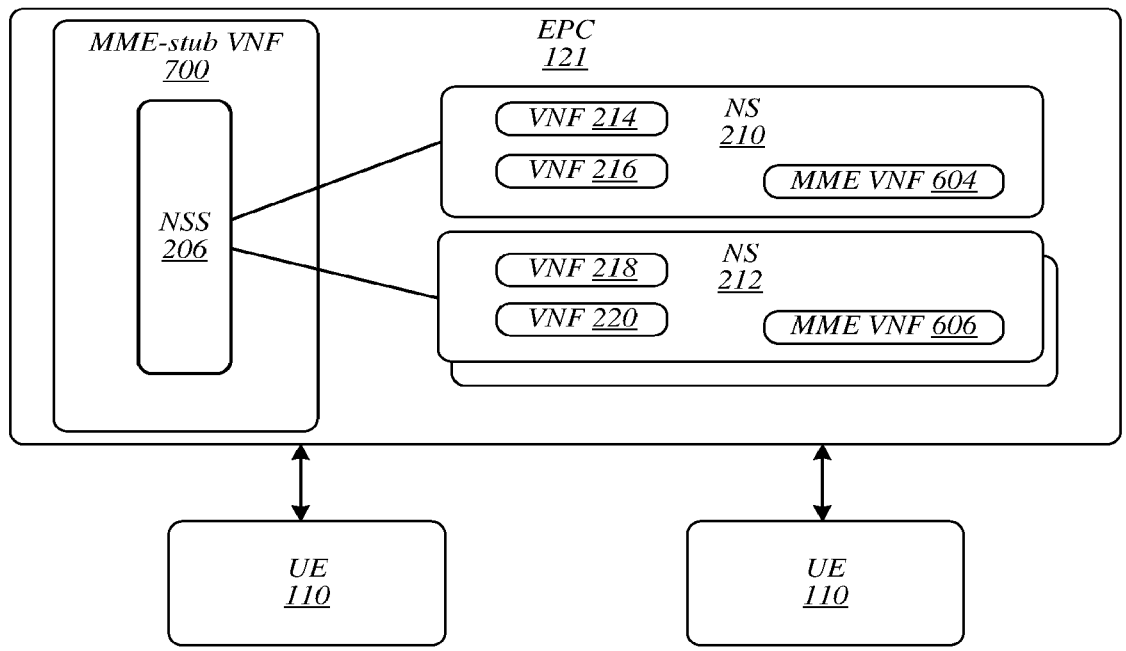
FIG. 7 illustrates one embodiment of the NSS as part of a MME-stub and NSs as part of the EPC

FIG. 7 illustrates the NSS 206 as part of a MME-stub VNF 700 and NSs 210 and 212 as part of the EPC 121. The number of NSs is exemplary only. The MME-stub 700 may contain the NSS 206, which may be a VNF responsible for allocating at least one or more UE 110 to one of the NSs 210 and/or 212, to thereby enable provisioning of the at least one or more UE 110. In one implementation, the MME-stub VNF 700 includes a subset of MME functionality, virtualized, that will be allocated to UEs 110 (e.g., all UEs 110) that request service from the EPC 121. The subset of MME-stub VNF 700 functionality may include, in addition to the NSS 206, for example, a virtualized network access control that manages authentication and authorization for the UEs 110. In this case, an initial request from at least one UE 110 would go to the MME-stub VNF 700, which would use its functionality (e.g., one or more VNF) to authenticate and authorize the at least one UE 110 to use the EPC 121. Subsequently, the MME-stub VNF 700 may use the NSS 206 to allocate one or more NS 210 and/or NS 212 to the at least one UE 110. In one implementation, the at least one UE 110 may be allocated a plurality of NSs (e.g., NS 210 and NS 212) in order to provision unique services to the at least one UE 110. The embodiments are not limited in this context.

In various embodiments, the EPC 121 may comprise the NS repository 208 (e.g., storage medium) that includes the one or more NS 210 and NS 212. Each NS 210 and 212 may include one or more VNF 214-220. Furthermore, the NS 210 may include the MME VNF 604 and the NS 212 may include an MME VNF 606. Furthermore, additional NSs implemented by the EPC 121 may include MME VNF types as well. For example, the MME VNF 604 may provide a subset of MME functionality to a first UE 110. The subset of MME functionality may include, for example, virtualized mobility management, paging, tracking area management, lawful intercept and/or load-balancing. Similarly, the MME VNF 606 may provide a subset of MME functionality to a second UE 110. The subset of MME functionality provided by the MME VNF 604 may be unique from the subset of MME functionality provided by the MMM VNF 606. The embodiments are not limited in this context.

The NSs comprised in the NS repository 208 may be cataloged to enable ease of search and retrieval of the NSs. Search of the NSs cataloged in the repository 208 may be performed by the EPC 121, or the like. In one implementation, the VNFs 214 and 216 in NS 210 are selected and included therein to meet the specific network needs of the first UE 110 type, where the VNFs 218 and 220 in the NS 212 are selected and included therein to meet the specific network needs of the second UE 110 type. For example, the first UE 110 may have a first set of data rate, mobility, latency tolerance, duty cycle, range and/or battery life requirements. The VNFs 214 and 216 of the NS 210 are bundled together to at least meet some or all of the indicated requirements of the first UE 110. Similarly, the second UE 110 may have a second set of data rate, mobility, latency tolerance, duty cycle, range and/or battery life requirements. The VNFs 218 and 220 of the NS 212 are bundled together to at least meet some or all of the indicated requirements of the second UE 110. The identified first set of UE requirements and second set of UE requirements may be unique. In one implementation, the NSS 206 selects the NS 210 or 212, for example, which will efficiently provision a given UE 110 in accordance some or more of the afore indicated requirements (e.g., UE data rate, mobility, latency tolerance, duty cycle, range and/or battery life requirements). The embodiments are not limited in this context.

Figure 8:
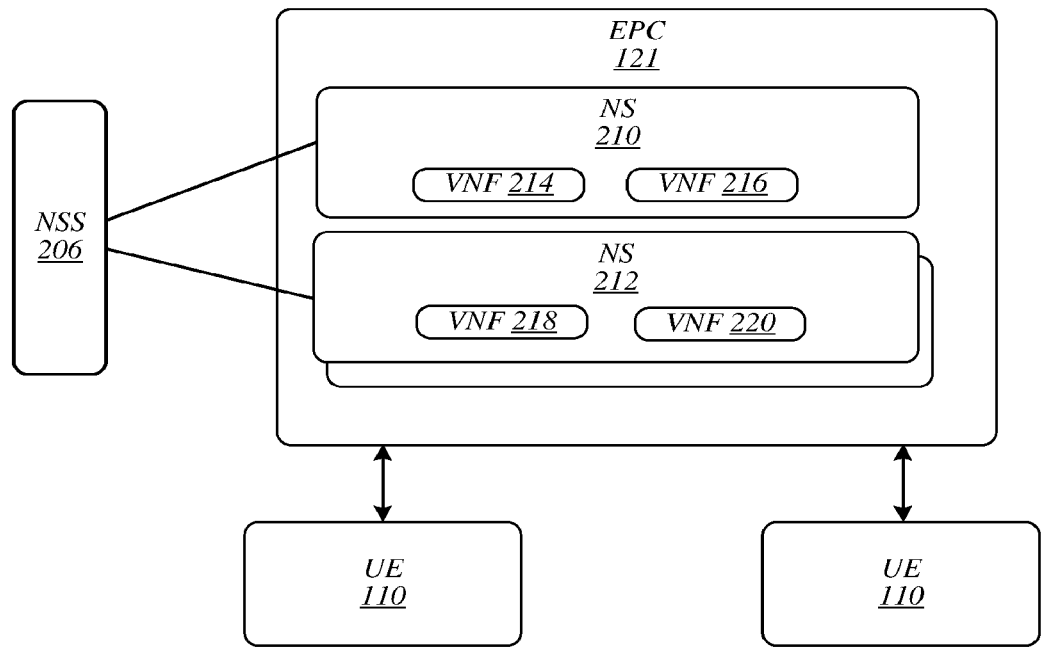
FIG. 8 illustrates one embodiment of the NSS as a standalone element and the NSs as part of the EPC.

FIG. 8 illustrates the NSS 206 as a standalone element (e.g., disparate from the EPC 121) and the NSs 210 and 212 as part of the EPC 121. The number of NSs is exemplary only. The NSS 206 may be operative, via the EPC 121, to use at least one of the NSs 210 and/or 212 to provision at least one or more UE 110. In various embodiments, the EPC 121 may comprise the NS repository 208 (e.g., storage medium) that includes the one or more NS 210 and NS 212. The NSs comprised in the NS repository 208 may be cataloged to enable ease of search and retrieval of the NSs. Search of the NSs cataloged in the repository 208 may be performed by the EPC 121, or the like. Each NS 210 and 212 may include one or more VNF 214-220. In one implementation, the VNFs 214 and 216 in NS 210 are selected and included therein to meet the specific network needs of a first UE 110 type, where the VNFs 218 and 220 in the NS 212 are selected and included therein to meet the specific network needs of a second UE 110 type. For example, the first UE 110 may have a first set of data rate, mobility, latency tolerance, duty cycle, range and/or battery life requirements. The VNFs 214 and 216 of the NS 210 are bundled together to at least meet some or all of the indicated requirements of the first UE 110. Similarly, the second UE 110 may have a second set of data rate, mobility, latency tolerance, duty cycle, range and/or battery life requirements. The VNFs 218 and 220 of the NS 212 are bundled together to at least meet some or all of the indicated requirements of the second UE 110. The identified first set of UE requirements and second set of UE requirements may be unique. In one implementation, the NSS 206 selects the NS 210 or 212, for example, which will efficiently provision a given UE 110 in accordance some or more of the afore indicated requirements (e.g., UE data rate, mobility, latency tolerance, duty cycle, range and/or battery life requirements). The embodiments are not limited in this context.

Figure 9:
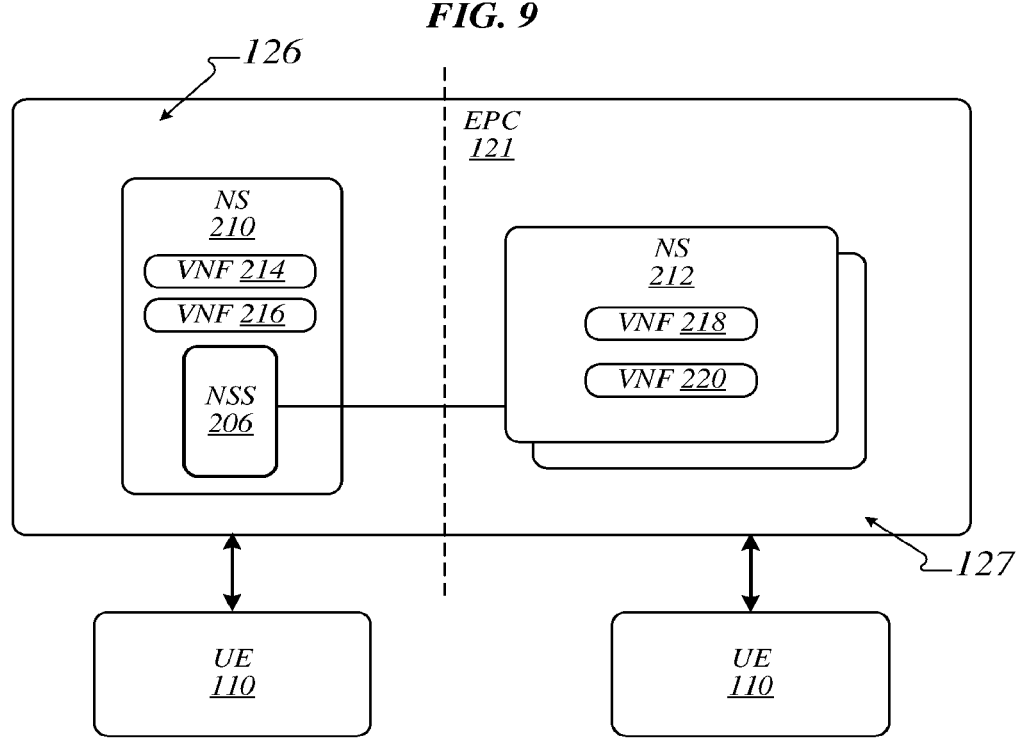
FIG. 9 illustrates one embodiment of the NSS and the NSs as part of the EPC.

FIG. 9 illustrates the NSS 206 and the NSs 210 and 212 as part of the EPC 121. The number of NSs is exemplary only. The EPC 121 may be operative to use at least one of the NSs 210 and/or 212 to provision at least one or more UE 110. Therefore, the EPC 121 may comprise the NSS 206. In this example embodiment, the NSS 206 is part of the NS 210, where the NS 210 is located in the control plane 126. Therefore, in this example embodiment, the NS 210 includes VNFs 214 and 216 that provision UEs 110 (e.g., all UEs 110) that request service from the EPC 121. In one implementation, the NS 210 may be considered a default NS.

In various embodiments, the EPC 121 may comprise the NS repository 208 (e.g., storage medium) that includes one or more NS 212. The NSs comprised in the NS repository 208 may be cataloged to enable ease of search and retrieval of the NSs. Search of the NSs cataloged in the repository 208 may be performed by the EPC 121, or the like. The NS 212 may include one or more VNF 218-220. In this example embodiment, at least the NS 212 is in the user plane 127. In one implementation, the VNFs 218 and 220 in the NS 212 are selected and included therein to meet the specific network needs of a first UE 110 type. For example, the first UE 110 may have a first set of data rate, mobility, latency tolerance, duty cycle, range and/or battery life requirements. The VNFs 218 and 220 of the NS 212 are bundled together to at least meet some or all of the indicated requirements of the first UE 110. At least one additional NS and associated VNFs may be implemented in the EPC 121 to at least provide provisioning for some or all of the connectivity and network requirements of a second UE 110. In one implementation, the NSS 206 selects the NS, for example, which will efficiently provision a given UE 110 in accordance some or more of the afore indicated requirements (e.g., UE data rate, mobility, latency tolerance, duty cycle, range and/or battery life requirements). The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 10:
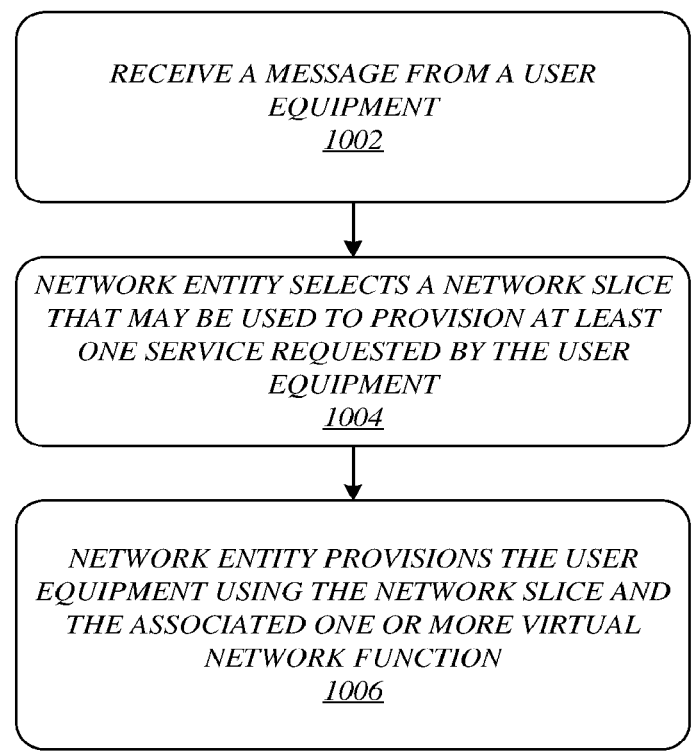
FIG. 10 illustrates one embodiment of a logic flow.

FIG. 10 illustrates one embodiment of a logic flow 1000, which may be representative of the operations executed by one or more embodiments described herein. More particularly, the logic flow 1000 may comprise an example of operations that one or more element illustrated in FIGS. 1-9 may perform to enable device provisioning that includes providing one or more network slice and associated virtual network functions that facilitate device connectivity to a telecommunications network.

As shown in logic flow 1000, a network entity receives a message or request from a UE at 1002. In an implementation, the network entity is a NSS. The NSS may be part of an eNB, EPC, MMC, MMC-stub, or the NSS may be a standalone element external of the EPC. The message may include a device profile and/or an identification of the UE. Furthermore, the message may include one or more service request. Alternatively, the message may include one or more service request as well as additional information (e.g., a device profile and/or an identification of the UE). In one implementation, the message may be an RRC connection request message. In another implementation, the message may be a NAS message.

At 1004, the network entity selects a NS that may be used to provision the UE. In one implementation, the network entity selects one or more NS to provision of the UE based on a service request made by the UE. In one implementation, the service request may be part of the message or request from the UE at 1002. The NS may comprise one or more VNF. The NS may alternatively comprise the network entity that receives the message and one or more VNF. In one implementation, the NS that includes the network entity, includes one or more default VNF. The network entity may select the NS based on the device profile and/or the identification included in the message. In one implementation, the message is an RRC connection request message. In a particular implementation, the identification of the UE is sufficient to enable the network entity to select the NS that may be used to provision the UE. Alternatively, in another implementation, the device profile of the UE is sufficient to enable the network entity to select the NS that may be used provision the UE. In one implementation, the NS includes a plurality of VNF. In another implementation, the network entity selects a plurality of NS that may be used to provision the user equipment. In one implementation, one of the plurality of NS is a default network slice that includes at least one default VNF, and another of the plurality of NS is a network slice that the network entity selects based on the device profile and/or the identification of the UE.

At 1006, the network entity provisions the UE using the NS and the associated one or more VNF. In one implementation, the network entity provisions the UE using a plurality of NSs. One NS may include one or more default VNF and another NS may include one or more VNF that is chosen based on device profile and/or identification of the UE.

FIG. 11 illustrates an embodiment of a storage medium 1100. The storage medium 1100 may comprise an article of manufacture. In one embodiment, the storage medium 1100 may comprise any non-transitory computer readable medium or machine readable medium, such as an optical, magnetic or semiconductor storage. The storage medium may store various types of computer executable instructions, such as instructions 1102 to implement one or more of logic flows described herein. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 12:
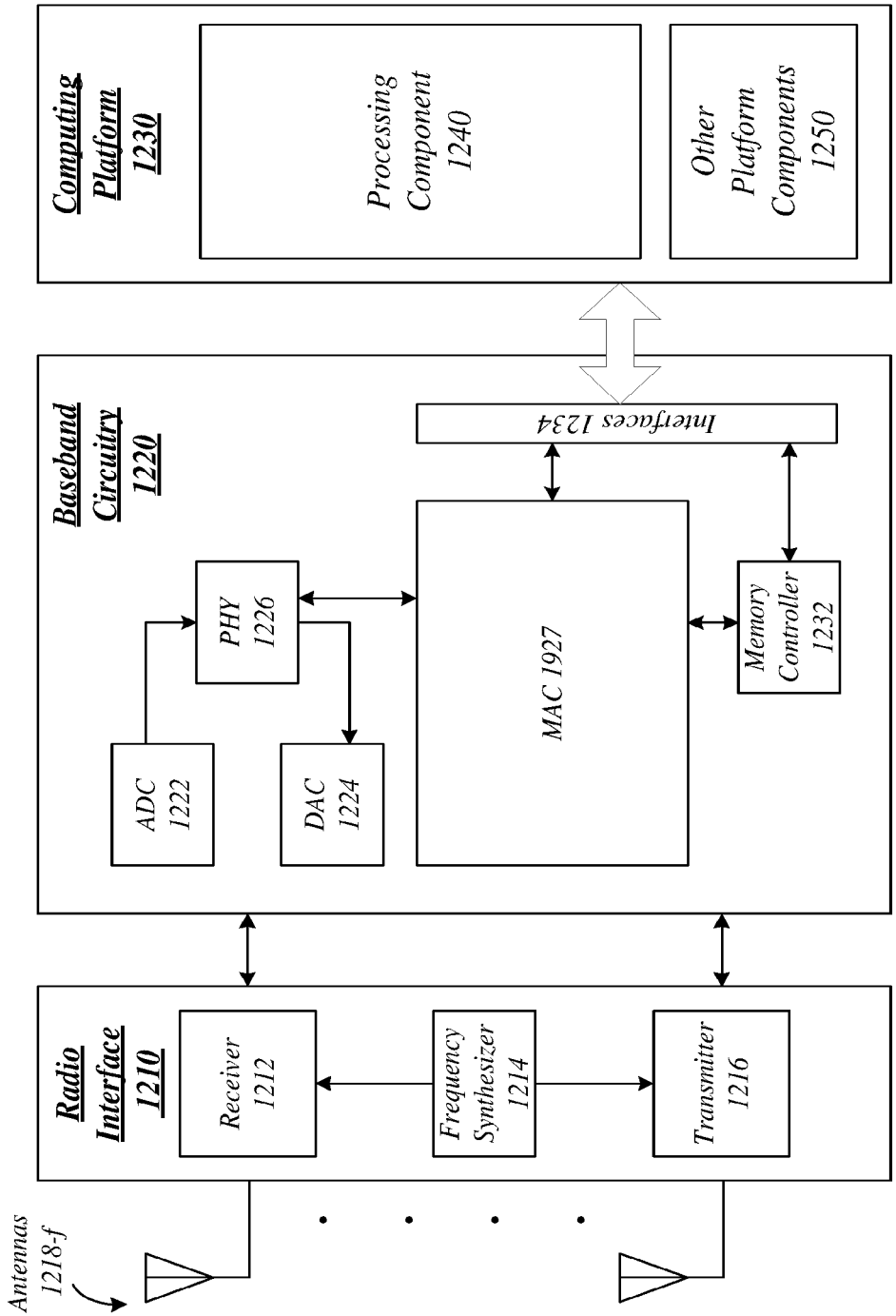
FIG. 12 illustrates one embodiment of a computing architecture.

FIG. 12 illustrates an embodiment of a device 1200 for use in a broadband wireless access network. Device 1200 may implement, for example, the apparatuses, systems, elements, components, storage, and/or logic described herein. The logic circuit 1228 may include physical circuits to perform operations described for the apparatuses, systems, elements, components, storage, and/or logic described herein, for example. As shown in FIG. 12, device 1200 may include a radio interface 1210, baseband circuitry 1220, and computing platform 1230, although the embodiments are not limited to this configuration.

The device 1200 may implement some or all of the structure and/or operations, for example, the apparatuses, systems, elements, components, storage, and/or logic described herein in a single computing entity, such as entirely within a single device. Alternatively, the device 1200 may distribute portions of the structure and/or operations, for example, the apparatuses, systems, elements, components, storage, and/or logic, described herein, across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1210 may include, for example, a receiver 1212, a frequency synthesizer 1214, and/or a transmitter 1216. Radio interface 1210 may include bias controls, a crystal oscillator and/or one or more antennas 1218-*f*. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1226 for PHY link layer processing of respective receive/transmit signals. Baseband circuitry 1220 may include, for example, a medium access control (MAC) processing circuit 1227 for MAC/data link layer processing. Baseband circuitry 1220 may include a memory controller 1232 for communicating with MAC processing circuit 1227 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames and/or packets. Alternatively or in addition, MAC processing circuit 1227 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for the apparatuses, systems, elements, components, storage, and/or logic described herein, for example, and/or logic circuit 1228 using the processing component 1240. The processing component 1240 (and/or PHY 19226 and/or MAC 1227) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1950. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired. In some embodiments, device 1900 may be configured to be compatible with protocols and frequencies associated one or more of the 3GPP LTE Specifications and/or IEEE 802.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218-*f*) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 13:
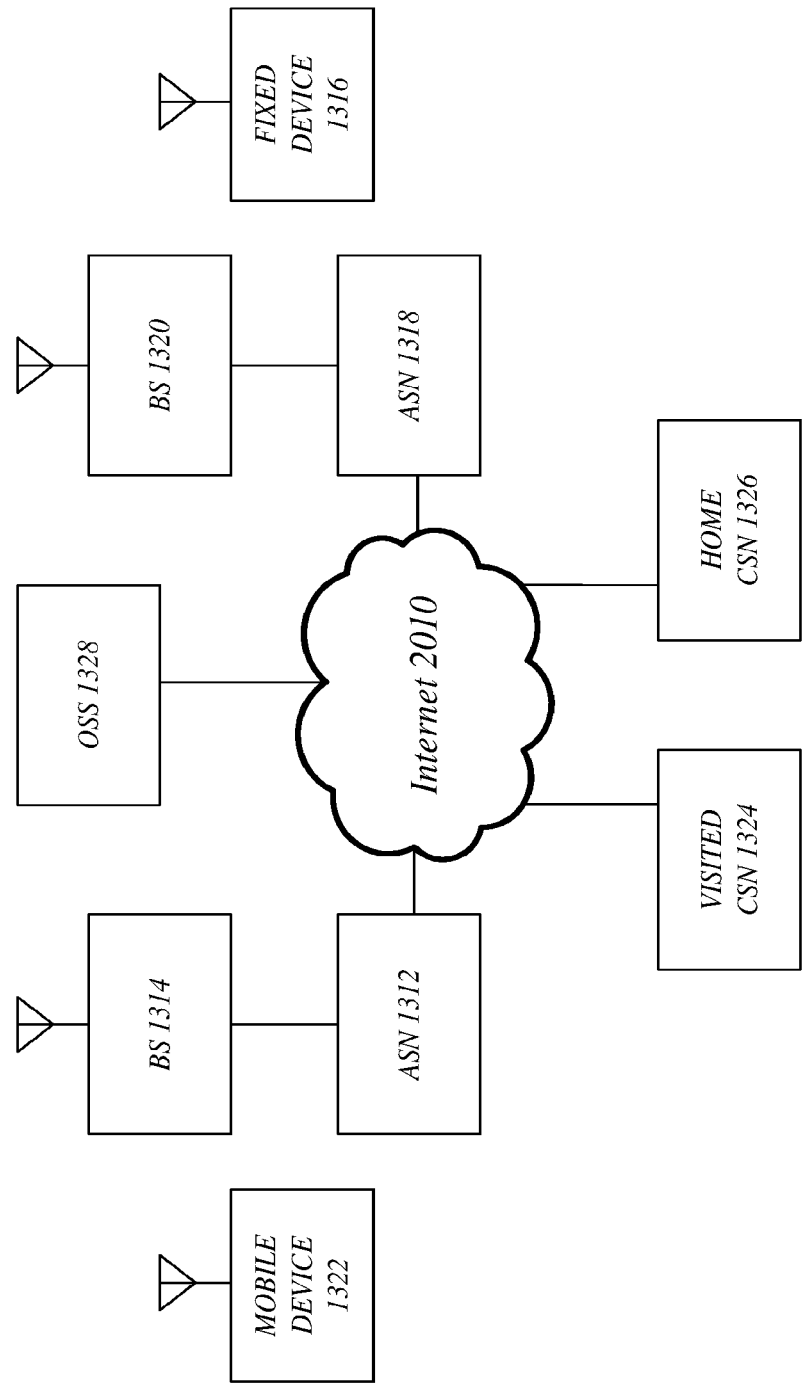
FIG. 13 illustrates one embodiment of a communications system.

FIG. 13 illustrates an embodiment of a broadband wireless access system 1300. As shown in FIG. 13, broadband wireless access system 1300 may be an internet protocol (IP) type network comprising an internet 1310 type network or the like that is capable of supporting mobile wireless access and/or fixed wireless access to internet 1310. In one or more embodiments, broadband wireless access system 1300 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 1300, access service networks (ASN) 1312, 1318 are capable of coupling with base stations (BS) (or eNodeBs) 1314, 1320, respectively, to provide wireless communication between one or more fixed devices 1316 and internet 1310 and/or between or one or more mobile devices 1322 and Internet 1310. One example of a fixed device 1316 and a mobile device 1322 is device 1200, with the fixed device 1316 comprising a stationary version of device 1200 and the mobile device 1322 comprising a mobile version of device 1200. ASNs 1312, 1318 may implement profiles that are capable of defining the mapping of network functions to one or more physical entities on broadband wireless access system 1300. Base stations (or eNodeBs) 1314, 1320 may comprise radio equipment to provide RF communication with fixed device 1316 and/or mobile device 1322, such as described with reference to device 1200, and may comprise, for example, the PHY and MAC layer equipment in compliance with a 3GPP LTE Specification or an IEEE 802.16 Standard. Base stations (or eNodeBs) 1314, 1320 may further comprise an IP backplane to couple to Internet 1310 via ASNs 1312, 1318, respectively, although the scope of the claimed subject matter is not limited in these respects.

Broadband wireless access system 1300 may further comprise a visited connectivity service network (CSN) 2024 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1324 or home CSN 1326, and the scope of the claimed subject matter is not limited in these respects. Visited CSN 2024 may be referred to as a visited CSN in the case where visited CSN 1324 is not part of the regular service provider of fixed device 1316 or mobile device 1322, for example where fixed device 2016 or mobile device 1322 is roaming away from its respective home CSN 1326, or where broadband wireless access system 1300 is part of the regular service provider of fixed device 1316 or mobile device 1322 but where broadband wireless access system 1300 may be in another location or state that is not the main or home location of fixed device 1316 or mobile device 1322.

Fixed device 1316 may be located anywhere within range of one or both base stations (or eNodeBs) 1314, 1320, such as in or near a home or business to provide home or business customer broadband access to Internet 1310 via base stations (or eNodeBs) 1314, 1320 and ASNs 1312, 1318, respectively, and home CSN 1326. It is worthy of note that although fixed device 1316 is generally disposed in a stationary location, it may be moved to different locations as needed. Mobile device 1322 may be utilized at one or more locations if mobile device 1322 is within range of one or both base stations (or eNodeBs) 1314,1320, for example.

In accordance with one or more embodiments, operation support system (OSS) 1328 may be part of broadband wireless access system 1300 to provide management functions for broadband wireless access system 1300 and to provide interfaces between functional entities of broadband wireless access system 1300. Broadband wireless access system 1300 of FIG. 13 is merely one type of wireless network showing a certain number of the components of broadband wireless access system 1300, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include ally suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

What has been described above includes examples of the disclosed architecture, system, devices, processes, structure, and functions. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1. An evolved node B (eNB), comprising: at least one memory; and a processor circuit coupled to the at least one memory, the processor circuit to: identify information for user equipment (UE), the information comprised in a received control message; select a network slice (NS) for allocation to the UE based on the identified information; and report the selected NS to a virtual network functions orchestrator.

Example 2. The eNB according to Example 1, wherein the NS comprises at least one virtual network function (VNF).

Example 3. The eNB according to Example 2, wherein the NS comprises at least two VNFs.

Example 4. The eNB according to any of Examples 1 to 3, wherein the identified information comprises a profile of the UE and/or an identification of the UE.

Example 5. The eNB according to Example 1, further comprising a plurality of NSs, each of the plurality of NSs including at least one VNF.

Example 6. The eNB according to Example 5, wherein the first of the plurality of NSs is designated for a first UE and a second of the plurality of NSs is designated for a second UE, the first and second UEs being unique.

Example 7. The eNB according to Example 5, wherein the at least one VNF of a first NS of the plurality of NSs is to provide functionality that is different than the functionality that is to be provided by the at least one VNF of a second NS of the plurality of NSs.

Example 8. An apparatus, comprising: at least one memory; and a processor circuit coupled to the at least one memory, the processor circuit to: identify information for a user equipment (UE), the information comprised in a received message; select a network slice (NS) for allocation to the UE based on the identified information, the NS comprising at least one virtual network function (VNF); and report the selected NS to a virtual network functions orchestrator.

Example 9. The apparatus according to Example 8, wherein the NS comprises a network slice selector (NSS) and the at least one VNF.

Example 10. The apparatus according to Example 9, wherein the apparatus is implemented by an evolved packet core (EPC).

Example 11. The apparatus according to Example 9, wherein the apparatus is implemented in an evolved packet core (EPC), and the NS comprising the NSS and the at least one VNF is implemented in a control plane of the EPC.

Example 12. The apparatus according to Example 11, further comprising another NS that is distinct from the NS comprising the NSS and the at least one VNF, the another NS is implemented in a user plane of the EPC.

Example 13. The apparatus according to any of Examples 8 to 9, wherein the apparatus is implemented in an evolved packet core (EPC).

Example 14. The apparatus to Example 9, wherein the NSS is implemented in a mobility management entity (MME)-stub and the NS is implemented in an evolved packet core (EPC).

Example 15. The apparatus according to Example 8, further comprising another NS that comprises at least one VNF, the another NS is distinct from the NS.

Example 16. The apparatus according to Example 8, wherein the information comprises a profile of the UE and/or an identification of the UE.

Example 17. The apparatus according to Example 8, wherein the received message is a radio resource control (RRC) connection request message.

Example 18. The apparatus according to Example 8, further comprising a plurality of NSs, each of the plurality of NSs including at least one VNF.

Example 19. An apparatus, comprising: at least one memory; and a processor circuit coupled to the at least one memory, the processor circuit to: identify information for a user equipment (UE) comprised in a received control message; elect a network slice (NS) comprising a first virtual network function (VNF) for allocation to the UE based on the identified information, the NS selected from a plurality of NSs each comprising at least one VNF; and report the selected NS to a virtual network functions orchestrator.

Example 20. The apparatus device according to Example 19, wherein the processor circuit is further to select another NS comprising a second VNF from the plurality of NSs irrespective of the identified information.

Example 21. The apparatus according to Example 20, wherein the NS and the first VNF are distinct from the another NS and the second VNF.

Example 22. The apparatus according to any of Examples 19 to 21, wherein the processor circuit is further to receive the identified information from the UE as part of the received control message, the information received from the UE comprises a profile of the UE and/or an identification of the UE.

Example 23. The apparatus according to Example 22, wherein the received control message is radio resource control (RRC) connection request message.

Example 24. The apparatus according to Example 19, wherein the processor circuit is to select the NS comprising the first VNF from a plurality of NSs implementing only one or more VNF.

Example 25. The apparatus according to any of Examples 19 to 21, wherein the NS is designated for a first UE type and the another NS is designated for any UE type.

Example 26. A base station, comprising: at least one memory; and a processor circuit coupled to the at least one memory, the processor circuit to: identify information for user equipment (UE), the information comprised in a received control message; select a network slice (NS) for allocation to the UE based on the identified information; and report the selected NS to a virtual network functions orchestrator.

Example 27. The base station according to Example 26, wherein the NS comprises at least one virtual network function (VNF).

Example 28. The base station according to Example 27, wherein the NS comprises at least two VNFs.

Example 29. The base station according to any of Examples 26 to 28, wherein the identified information comprises a profile of the UE, an identification of the UE, and/or at least one service requested by the UE.

Example 30. The base station according to any of Examples 26 to 27, further comprising a plurality of NSs, each of the plurality of NSs including at least one VNF.

Example 31. The base station according to any of Examples 26 to 28, wherein the received control message is provided using a radio resource control (RRC) protocol and the base station is an evolved node B (eNB).

Example 32. The base station according to Example 30, wherein the at least one VNF of a first NS of the plurality of NSs is to provide functionality that is different than the functionality that is to be provided by the at least one VNF of a second NS of the plurality of NSs.

Example 33. An apparatus, comprising: at least one memory; and a processor circuit coupled to the at least one memory, the processor circuit to: identify information for a user equipment (UE), the information comprised in a received message; select a network slice (NS) for allocation to the UE based on the identified information, the NS comprising at least one virtual network function (VNF); and report the selected NS to a virtual network functions orchestrator.

Example 34. The apparatus according to Example 33, wherein the NS comprises a network slice selector (NSS) and the at least one VNF.

Example 35. The apparatus according to Example 34, wherein the apparatus is implemented by an evolved packet core (EPC).

Example 36. The apparatus according to Example 34, wherein the apparatus is implemented in an evolved packet core (EPC), and the NS comprising the NSS and the at least one VNF is implemented in a control plane of the EPC.

Example 37. The apparatus according to Example 36, further comprising another NS that is distinct from the NS comprising the NSS and the at least one VNF, the another NS is implemented in a user plane of the EPC.

Example 38. The apparatus according to Example 33, wherein the apparatus is implemented in an evolved packet core (EPC) and/or a mobility management entity (MME).

Example 39. The apparatus according to Example 34, wherein the NSS is implemented in a mobility management entity (MME)-stub and the NS is implemented in an evolved packet core (EPC), the MME-stub functional to provide MME functionality.

Example 40. The apparatus according to Example 33, wherein the NSS is implemented in a mobility management entity (MME)-stub, the MME-stub to provide MME authentication functionality.

Example 41. The apparatus according to Example 33, further comprising another NS that comprises at least one VNF, the another NS is distinct from the NS.

Example 42. The apparatus according to Example 33, wherein the identified information comprises a profile of the UE, an identification of the UE, and/or at least one service requested by the UE.

Example 43. The apparatus according to Example 33, wherein the received message is a radio resource control (RRC) connection request message, service request message, and/or a non-access stratum (NAS) message.

Example 44. The apparatus according to Example 33, further comprising a plurality of NSs, each of the plurality of NSs including at least one VNF.

Example 45. An apparatus, comprising: at least one memory; and a processor circuit coupled to the at least one memory, the processor circuit to: identify information for a user equipment (UE) comprised in a received control message; select a network slice (NS) comprising a first virtual network function (VNF) for allocation to the UE based on the identified information, NS selected from a plurality of NSs each comprising at least one VNF; and report the selected NS to a virtual network functions orchestrator.

Example 46. The apparatus device according to Example 45, wherein the processor circuit is further to select another NS comprising a second VNF from the plurality of NSs irrespective of the identified information.

Example 47. The apparatus according to Example 46, wherein the NS and the first VNF are distinct from the another NS and the second VNF.

Example 48. The apparatus according to Example 45, wherein the processor circuit is further to receive the identified information from the UE as part of the received control message, the information received from the UE comprises a profile of the UE and/or an identification of the UE.

Example 49. The apparatus according to Example 48, wherein the received control message is radio resource control (RRC) connection request message and/or non-access stratum (NAS) message.

Example 50. The apparatus according to Example 45, wherein the NS is designated for a first UE type and the another NS is designated for any UE type.

Example 51. An evolved node B (eNB), comprising: a processor circuit; a network slice selector (NSS) for execution by the processor circuit to select a network slice (NS) based on an information provided by a user equipment (UE).

Example 52. The eNB according to Example 51, wherein the NS comprises at least one virtual network function (VNF).

Example 53. The eNB according to Example 52, wherein the NS comprises at least two VNFs.

Example 54. The eNB according to Example 51, wherein the information provided by the UE is a message including a profile of the UE and/or an identification of the UE.

Example 55. The eNB according to Example 51, further comprising a plurality of NSs, each of the plurality of NSs including at least one VNF.

Example 56. The eNB according to Example 55, wherein the first of the plurality of NSs is designated for a first UE and a second of the plurality of NSs is designated for a second UE, the first and second UEs being unique.

Example 57. The eNB according to Example 55, wherein the at least one VNF of a first NS of the plurality of NSs is to provide functionality that is different than the functionality that is to be provided by the at least one VNF of a second NS of the plurality of NSs.

Example 58. A network device, comprising: a processor circuit; a network slice selector (NSS) for execution by the processor circuit to select a network slice (NS) comprising at least one virtual network function (VNF) based on an information provided by a user equipment (UE).

Example 59. The network device according to Example 58, wherein the NS comprises the NSS and the VNF.

Example 60. The network device according to Example 59, wherein the network device is implemented by a mobility management entity (MME).

Example 61. The network device according to Example 59, wherein the network device is implemented in an evolved packet core (EPC), and the NS comprising the NSS and the VNF is implemented in a control plane of the EPC.

Example 62. The network device according to Example 61, further comprising another NS that is distinct from the NS comprising the NSS and the VNF, the another NS is implemented a user plane of the EPC.

Example 63. The network device according to Example 58, wherein the network device is implemented in an evolved packet core (EPC).

Example 64. The network device according to Example 58, wherein the NSS is implemented in mobility management entity (MME)-stub and the NS is implemented in an MME, the MME-stub and the MME being distinct network entities.

Example 65. The network device according to Example 58, further comprising another NS that comprises at least one VNF, the another NS is distinct from the NS.

Example 66. The network device according to Example 58, wherein the information provided by the UE is a message including a profile of the UE and/or an identification of the UE.

Example 67. The network device according to Example 66, wherein the message is radio resource control (RRC) connection request message.

Example 68. The network device according to Example 58, further comprising a plurality of NSs, each of the plurality of NSs including at least one VNF.

Example 69. A network device, comprising: a processor circuit; a network slice selector (NSS) for execution by the processor circuit to select a network slice (NS) comprising a first virtual network function (VNF) based on an information provided by a user equipment (UE), the NSS comprised in another NS comprising a second VNF.

Example 70. The network device according to Example 69, wherein the NSS is further executed by the processor circuit to select the another NS irrespective of the information provided by the UE.

Example 71. The network device according to Example 69, wherein the network device is implemented by a mobility management entity (MME).

Example 72. The network device according to Example 69, wherein the network device is implemented in an evolved packet core (EPC.

Example 73. The network device according to Example 69, further comprising a third NS that is distinct from the NS comprised in the NSS and the VNF, the third NS is implemented a user plane of the EPC.

Example 75. The network device according to Example 69, wherein the NSS is implemented in a mobility management entity (MME)-stub and the NS is implemented in an MME, the MME-stub and the MME being distinct network entities.

Example 76. The network device according to Example 69, wherein the information provided by the UE is a message including a profile of the UE and/or an identification of the UE.

Example 77. The network device according to Example 76, wherein the message is radio resource control (RRC) connection request message.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network device, comprising:
   at least one memory; and
   a processor circuit coupled to the at least one memory, the processor circuit configured to:
      receive a control message from a user equipment (UE), via a radio resource control (RRC) protocol, comprising an identifier of the UE and a profile of the UE indicating a service type associated with the UE;
      select a network slice (NS) for allocation to the UE, from a plurality of NSs stored in the at least one memory and based on the identifier of the UE or the service type indicated by the profile of the UE; and
      trigger a network function based on the selected NS.

2. The network device according to claim 1, wherein the service type associated with the UE is used to select the NS.

3. The network device according to claim 1, wherein the service type associated with the UE and the identifier of the UE are used to select the NS.

4. The network device according to claim 1, wherein the service type associated with the UE indicates one or more network slices appropriate for a need of the UE including the NS selected for allocation to the UE.

5. The network device according to claim 1, wherein the identifier of the UE comprises a random value.

6. The network device according to claim 1, the processor circuit further configured to:
   store the profile of the UE in the at least one memory, and
   select the NS in a subsequent access to provision the UE using the profile of the UE stored if the identifier of the UE is received.

7. The network device according to claim 1, further comprising:
   at least one VNF included in each of the plurality of NSs that is selected based on the control message, and
   wherein the at least one VNF of a first NS of the plurality of NSs is to provide functionality that is different than that is to be provided by the at least one VNF of a second NS of the plurality of NSs.

8. An apparatus, comprising:
at least one memory configured to store instructions and profiles for user equipments (UEs); and
a processor circuit coupled to the at least one memory, the processor circuit, when executing the instructions, configured to:
receive a message from a UE comprising a profile of the UE, wherein the message received is a radio resource control (RRC) connection request message, service request message, or a non-access stratum (NAS) message, and wherein the profile of the UE comprises a service type associated with the UE and a UE identity;
select, based on the profile of the UE, a network function associated with a network slice (NS) used to provision the UE, wherein the NS is associated with the service type associated with the UE; and
trigger the network function.

9. The apparatus according to claim 8, wherein the processor circuit is further configured to determine a network subscription based on a value of the UE identity.

10. The apparatus according to claim 8, wherein the processor circuit is further configured to:
cluster the NS with different virtual network functions (VNFs) based on a device type of the UE and with different services than another UE of the same device type;
wherein the UE comprises a first type of cellular Internet of Things (IoT) device and the another UE comprises a second type of cellular IoT device that is different from the first type of cellular IoT device according to at least one of: an automation and monitoring device, a wearable device, a health monitoring device, a vehicular device, a fleet management device, a security and surveillance device, or a structural device.

11. The apparatus according to claim 8, wherein the apparatus is implemented in a base station.

12. The apparatus according to claim 8, wherein the apparatus is implemented in an evolved packet core (EPC), and the NS comprising a network slice selector (NSS) and at least one VNF is implemented in a control plane of the EPC.

13. The apparatus according to claim 12, further comprising another NS that is distinct from the NS comprising the NSS and the at least one VNF, the another NS is implemented in a user plane of the EPC.

14. The apparatus according to claim 8, wherein a network slice selector (NSS) is implemented in a mobility management entity (MME)-stub, and the NS is implemented in an evolved packet core (EPC), the MME-stub functional to provide MME authentication functionality.

15. The apparatus according to claim 8, further comprising another NS that comprises at least one VNF, the another NS is distinct from the NS.

16. The apparatus according to claim 8, wherein the profile of the UE comprises at least one service requested by the UE.

17. The apparatus according to claim 8, wherein the processor circuit is further to select another NS for allocation to an Internet of Things (IoT) device that is different from the UE based on the profile of the UE.

18. An apparatus, comprising:
at least one memory configured to store profiles for one or more user equipments (UEs), the profiles for the one or more UEs respectively comprises a service type and a UE identity; and
a processor circuit coupled to the at least one memory, the processor circuit configured to:
receive, from a UE of the one or more UEs, radio resource control (RRC) connection message, comprising a profile of the UE comprising a service type associated with the UE and/or a UE identity for the UE;
select, based on the one or more UE profiles stored in the at least one memory and the UE profile received from the UE, a network slice (NS) from a plurality of NSs to provision the UE; and
trigger a network function based on the selected NS.

19. The apparatus according to claim 18,
wherein the processor circuit is further configured to select another NS from the plurality of NSs distinct from the NS irrespective of the UE identity, and
wherein the NS is designated for a first UE type and the another NS is designated for any UE type.

20. The apparatus according to claim 18, wherein the processor circuit is further configured to determine the NS that is associated with a connectivity service to provision the UE based on the UE identity of the received RRC connection message.

* * * * *